INVENTOR.
Arthur B. Larsen
BY
ATTORNEYS

LIGHT LOAD CONDITIONS

HEAVY LOAD CONDITIONS

United States Patent Office 3,458,797
Patented July 29, 1969

3,458,797
INVERTER CIRCUIT FOR SUPPLYING A SINE WAVE SUBSTANTIALLY FREE OF HARMONICS
Arthur B. Larsen, Red Bank, N.J., assignor to TRW, Inc., Cleveland, Ohio, a corporation of Ohio
Filed Aug. 15, 1967, Ser. No. 660,662
Int. Cl. H02m 1/12, 1/08
U.S. Cl. 321—9                                              4 Claims

ABSTRACT OF THE DISCLOSURE

An inverter circuit wherein a pair of inverters are used to convert energy from a DC source into square waves which are applied to separate primary windings of a single transformer having a secondary winding inductively coupled to both primary windings. A capacitor is connected in parallel with the secondary winding to define a tuned circuit resonant at the desired output frequency. With this arrangement, the relative phase of the square waves applied to the primary windings may be adjusted so that just enough excitation may be applied to the tuned secondary circuit to make up the secondary and load losses when the output voltage is at the desired value. The relative phase of the square waves may be readily controlled, either manually, or automatically in response to a load voltage sensing circuit and/or a load current sensing circuit, operative to provide automatic voltage regulation and/or automatic current regulation or limiting.

SUMMARY

A very important feature of the invention is in the use of a transformer of special design wherein a core of magnetic material is provided having a pair of outer portions respectively receiving the primary windings and a center portion receiving the secondary winding, with a pair of magnetic shunt portions between the outer portions and the center portions for defining a magnetic flux path linking the primary windings independently of the secondary windings and to also define a magnetic flux path for the secondary winding which does not link the primary windings.

With this arrangement, harmonic voltages in the output are effectively suppressed because of the magnetic shunt portions which allow the magnetic flux at harmonic frequencies to flow through the primary flux path without having to link the secondary winding. Accordingly, the harmonic voltages appear only across the primary windings which is a highly desirable feature in that the square wave sources are not heavily loaded.

The special transformer design has a further advantage in providing an effective limitation on current in the output circuit.

This invention contemplates other objects, features and advantages which will become more fully apparent from the following detailed description taken in conjunction with the accompanying drawings which illustarte a preferred embodiment.

BACKGROUND OF THE INVENTION

Field of the invention

The field of art to which this invention pertains is an inverter circuit which is operative to suply a sine wave substantially free of harmonics and which is comparatively simple, compact, light in weight, highly efficient and readily controlled, either manually or automatically.

DESCRIPTION OF THE PREFERRED EMBODIMENT

Figure 1:
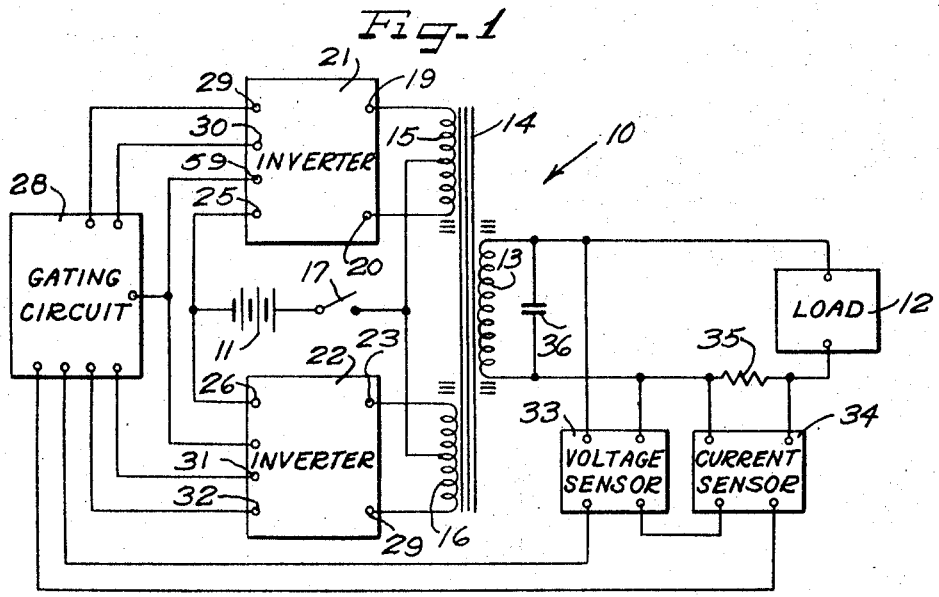
FIGURE 1 is a schematic electrical diagram of an inverter circuit constructed according to the principles of this invention.

Referring to FIGURE 1, reference numeral 10 generally designates an inverter circuit constructed according to this invention, designed to convert DC supplied by a battery 11 to AC which is supplied to a load 12. The inverter circuit is comparatively simple and light in weight and yet is highly efficient. In addition, it operates to supply a harmonic free sine wave, and its output may be readily controlled either manually or automatically.

The load 12 is connected to a secondary winding 13 of a transformer 14 having a pair of center-tapped primary windings 15 and 16, the center taps of which are connected through an on-off switch 17 to the positive terminal of the battery 11. The end terminals of the primary winding 15 are connected to the terminals 19 and 20 of a first inverter 21 while a second inverter 22 has terminals 23 and 24 connected to the end terminals of the winding 16. Terminals 25 and 26 of the inverters 21 and 22 are connected to the negative terminal of the battery 11.

The inverters 21 and 22 operate to supply square waves to the windings 15 and 16, and the relative phase of the square waves is controlled to develop the proper output in the secondary winding 13. To control the inverters 21 and 22 a gating circuit 28 is provided which supplies gating signals to input terminals 29 and 30 of the inverter 21 and input terminals 31 and 32 of the inverter 22. The gating circuit may be controlled automatically from a signal applied thereto from the ouputs of a voltage sensing circuit 33 and a current sensing circuit 34, input terminals of the voltage sensing circuit 33 being connected across the secondary winding 13 and input terminals of the current sensing circuit 34 being connected across a resistor 35 connected in series between the secondary winding 13 and the load 12.

An important component of the circuit is a capacitor 36 which is connected in parallel with the secondary winding 13. Capacitor 36 has a value such that it cooperates with the effective inductance of the secondary winding 13 to define a parallel circuit resonant at the desired operating frequency. The effective inductance of the winding 13 is measured with the primary windings 15 and 16 shorted.

In operation, the square waves developed in the primary windings 15 and 16 are controlled in phase so that just enough excitation is applied to the tuned or resonant secondary circuit to make up the load losses when the output voltage is at the desired value.

Figure 3:
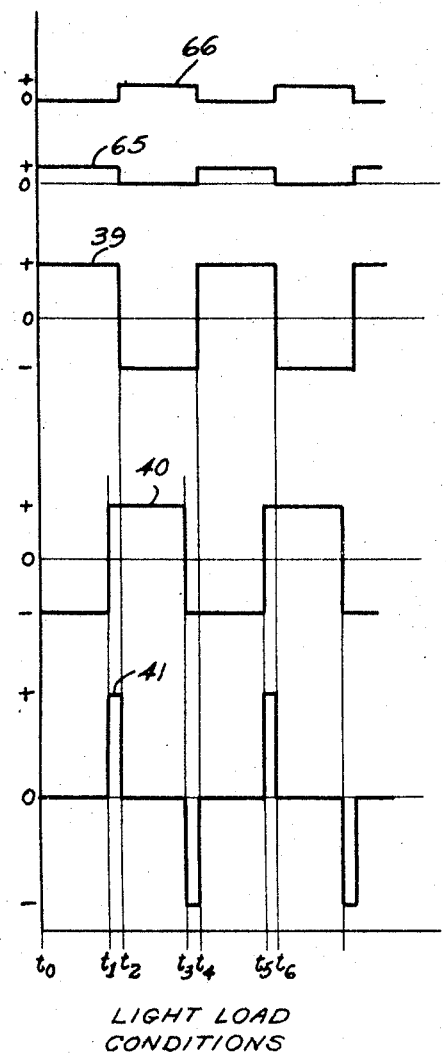
FIGURE 3 is a graphical representation of a pair of gating pulses applied to the inverter circuit and a pair of square waves applied to a pair of primary windings during light load conditions.

FIGURE 3 shows graphically the square waves 39 and 40 applied to the primary wnidings 15 and 16 respectively during a light load condition, square waves 39 and 40 being predominately out of phase to provide an equivalent input to the primary windings 15 and 16 taken as a whole, which comprises short positive and negative pulses as indicated graphically by waveform 41. During time interval $t_0$–$t_1$ both the square waves 39 and 40 are of the same amplitude but one is positive and the other is negative, and therefore the resulting signal applied to the primary windings 15 and 16 as a whole, is zero. At time $t_1$ the square wave 40 changes direction to coincide with square wave 39, which presents an equivalent input to the primary windings 15 and 16 as a whole in the form of a short pulse 41.

Figure 4:
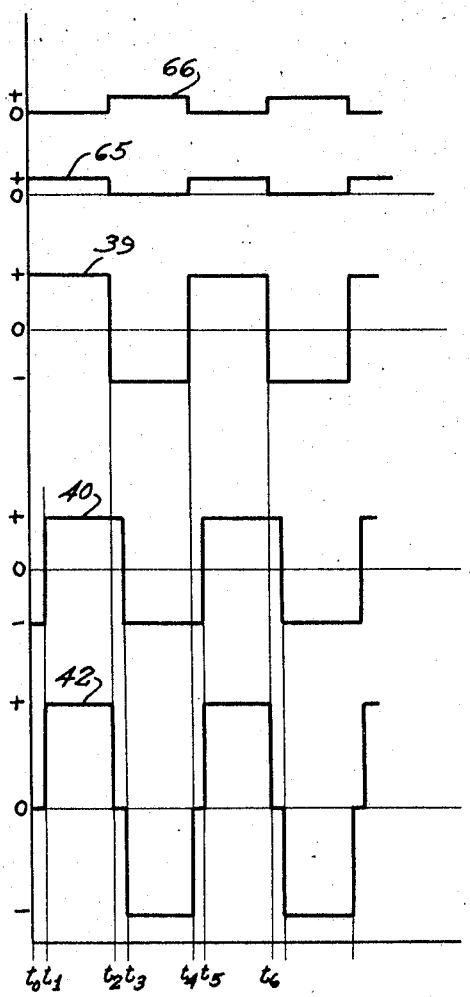
FIGURE 4 is a graphical representation of a pair of gating pulses applied to the inverter circuits and a pair of square waves applied to a pair of primary windings during heavy load conditions.

FIGURE 4 shows graphically the square waves 39 and 40 applied to the primary windings 15 and 16 during a heavy load condition, square waves 39 and 40 now being generally in phase to provide an equivalent input pulse 42 of comparatively long duration in the primary windings 15 and 16 as a whole. The operation during time $t_0$–$t_1$ and $t_1$–$t_2$ is similar to that mentioned above.

Figure 2:
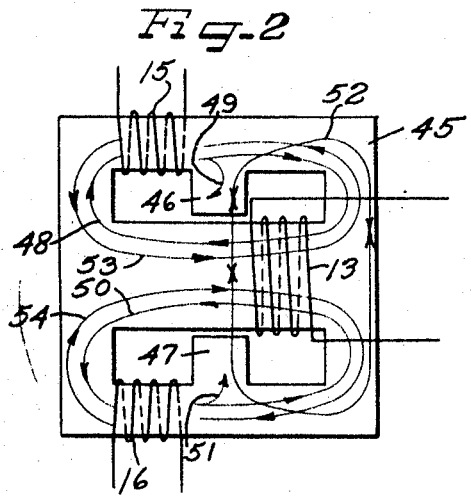
FIGURE 2 is a front view of a transformer used in the inverter circuit of FIGURE 1, showing the design of a laminated core assembly thereof and the location thereon of a pair of primary windings and a secondary winding.

A very important feature of this invention is in the construction of the transformer 14 as shown diagrammatically in FIGURE 2. The primary windings 15 and 16 and the secondary winding 13 are mounted on a common laminated core assembly 45, primary windings 15 and 16 being placed on the core assembly in such a manner as to have an equal amount of mutual inductance with the secondary winding 13. A magnetic shunt 46 is placed in close relation with primary winding 15 and secondary winding 13 while a magnetic shunt 47 is placed in close relation with primary winding 16 and secondary winding 13. Therefore, it can be seen that the secondary winding 13 has an association with the primary windings 15 and 16 and the magnetic shunts 46 and 47.

The magnetic shunts 46 and 47 provide magnetic flux paths for both the primary windings 15 and 16 as well as a magnetic flux path for the secondary winding 13. It is because of these magnetic shunts 46 and 47 that the transformer 14 achieves both current limiting and harmonic suppression.

The current limiting is accomplished by offering a pair of parallel magnetic flux paths indicated by lines 48 and 49 for the primary winding 15 and a pair of parallel magnetic flux paths indicated by lines 50 and 51 for the primary winding 16. If the secondary load 11 becomes too great, only that portion of the transformer core which is affected by the flux paths 48 and 50 flowing in it will become saturated leaving the high reluctance paths 49 and 51 virtually unaffected, thereby limiting the current in the primary windings 15 and 16.

In a similar manner, harmonic suppression is also accomplished by this unique design. Due to the low impedance of capacitor 36 to harmonic voltages, most of this harmonic content of the equivalent input voltage (bottom line of FIGS. 3 and 4) appears across an effective inductance which is supported by the flux path 52. The harmonic voltage across such an effective inductance suppresses the harmonic effect of the input signal and keeps the harmonic content from reaching the load 12.

In operation, the inverters 21 and 22 apply square waves 39 and 40 to the primary windings 15 and 16 of the transformer 14. During time interval $t_0$–$t_1$, a magnetic flux path indicated by line 53 and the magnetic flux path 50 are in opposite directions which has a cancelling effect, thereby producing an equivalent input to primary windings 15 and 16 as a whole, equal to zero. At time $t_1$, the square wave 40 goes positive causing the magnetic flux path 50 to reverse in the direction indicated by a line 54. During the time interval $t_1$–$t_2$, the magnetic flux paths 53 and 54 are additive causing a mutual inductance in the secondary winding 13 equivalent to the positive pulse 41, FIGURE 3. At time $t_2$ the square wave 39 goes negative causing the magnetic flux path 53 to reverse in the direction indicated by the line 48. During the time interval $t_2$–$t_3$, the magnetic flux paths 48 and 54 are in opposite directions which has a cancelling effect, producing an equivalent input of zero. At time $t_3$, the square wave 40 goes negative causing the magnetic flux path 54 to reverse in the direction of line 50. During time interval $t_3$–$t_4$, the magnetic flux paths 50 and 48 are additive causing a mutual inductance in the secondary equivalent to the negative pulse 41, FIGURE 3. At time $t_4$, square wave 39 goes positive again, thereby causing the above-mentioned operation to repeat itself.

Figure 5:
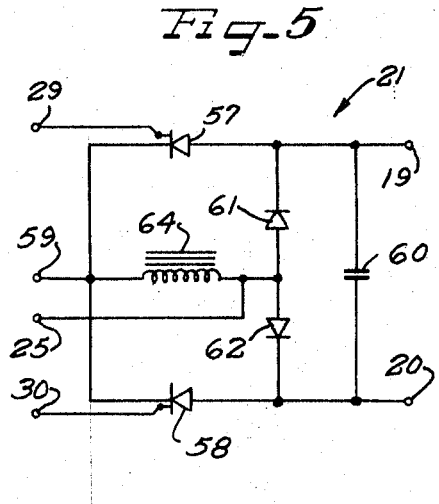
FIGURE 5 is a typical inverter circuit usable in the circuit of FIGURE 1 to produce square waves which are applied to the primary windings of a transformer thereof.

FIGURE 5 shows a typical construction of the inverter circuit 21 which can be used to produce the square wave 39. A pair of silicon controlled rectifiers 57 and 58 have their cathodes connected to a common terminal 59 and their anodes connected to the terminals 19 and 20 respectively. Terminals 19 and 20 are also connected to a commutating capacitor 60 and the cathodes of a pair of rectifiers 61 and 62. The anodes of the rectifiers 61 and 62 are connected to the terminal 25 and to a commutating inductor 64, the other end of the inductor 64 being connected to the terminal 59.

In operation, a gating pulse 65, FIGURE 3, is applied between terminals 29 and 59 rendering rectifier 57 conductive, and thereby applying a positive square wave to the primary winding 15 of the transformer 14. At a predetermined time the gating pulse 65 will cease and a gating pulse 66 will be applied between terminals 30 and 59 rendering rectifier 58 conductive, at which time rectifier 57 is commutated off, by the commutating capacitor 60 and commutating inductor 64 in a manner common in the art of solid state inverter circuits, thereby applying a negative square wave to the primary winding 15 of the transformer 14.

The inverter circuit 22 may be identical to that illustrated in FIGURE 5, to produce square wave 40 which is applied to the primary winding 16 of the transformer 14.

The gating circuits 28 and the voltage and current sensing circuits 33 and 34 may have constructions similar to those of the control circuit of FIGURE 3 of a Carmelo J. Amato Patent No. 3,181,053, wherein voltage and current sensing circuits control reset voltages applied to magnetic amplifier devcies, to control the relative timing of gating signals. It will be understood, of course, that any suitable types of gating circuits and voltage and current sensing circuits may be used.

It will be understood that modifications and variations may be effected without departing from the spirit and scope of the novel concepts of this invention.

I claim as my invention:
1. In an inverter for supplying AC to a load,
a transformer having a core of magnetic material,
a secondary winding on said core for connection to the load,
and a pair of primary windings on said core inductively coupled to said secondary winding,
a capacitor in parallel with said secondary winding to define a tuned secondary circuit,
means for applying a pair of square waves to said pair of primary windings,
means for controlling the relative phase of said square waves to apply sufficient excitation to said tuned secondary circuit to make up the secondary and load losses when the output voltage is at the desired value,
and magnetic shunt means associated with said core for defining a magnetic flux path linking said primary windings independently of said secondary winding.

2. In an inverter for supplying AC to a load,
a transformer having a core of magnetic material,
a secondary winding on said core for connection to the load,
and a pair of primary windings on said core inductively coupled to said secondary winding, a capacitor in parallel with said secondary winding to define a tuned secondary circuit, means for applying a pair of square waves to said pair of primary windings, and means for controlling the relative phase of said square waves to apply sufficient excitation to said tuned secondary circuit to make up the secondary and load losses when the output voltage is at the desired value, said core having a pair of outer portions respectively receiving said primary winding and a center portion intermediate said pair of outer portions and receiving said secondary winding, and a pair of magnetic shunt portions between said pair of outer portions and said center portion positioned to define a magnetic flux path linking said primary windings independently of said secondary winding and to define a magnetic flux path for said secondary winding which does not link said primary windings.

3. In an inverter for supplying AC to a load, a transformer having a core of magnetic material, a secondary winding on said core for connection to the load, and a pair of primary windings on said core inductively coupled to said secondary winding, a capacitor in parallel with said secondary winding to define a tuned secondary circuit, means for applying a pair of square waves to said pair of primary windings, means for controlling the relative phase of said square waves to apply sufficient excitation to said tuned secondary circuit to make up the secondary and load losses when the output voltage is at the desired value, and magnetic shunt means associated with said core for defining a magnetic flux path linking said primary windings independently of said secondary winding, said magnetic shunt means being formed partly by magnetic material and partly by at least one air gap.

4. In an inverter for supplying AC to a load, a transformer having a core of magnetic material, a secondary winding on said core for connection to the load, and a pair of primary windings on said core inductively coupled to said secondary winding, a capacitor in parallel circuit said secondary winding to define a tuned secondary circuit, a pair of inverters coupled to said primary windings each comprising a pair of controlled rectifiers alternately conductive to develop square waves in said primary windings, and means for controlling the relative phase of operation of said inverters to apply sufficient excitation to said tuned secondary circuit to make up the secondary and load losses when the output voltage is at the desired value, and magnetic shunt means associated with said core for defining a magnetic flux path linking said primary windings independently of said secondary winding.

References Cited

UNITED STATES PATENTS

| | | | |
|---|---|---|---|
| 2,875,351 | 2/1959 | Collins | 321—9 XR |
| 3,010,062 | 11/1961 | Van Emden | 321—27 XR |
| 3,031,629 | 4/1962 | Kadri | 321—113 |
| 3,205,424 | 9/1965 | Bates | 321—18 |
| 3,278,827 | 10/1966 | Corey et al. | 321—44 |
| 3,242,415 | 3/1966 | King et al. | 321—45 |
| 3,297,936 | 1/1967 | Ruch | 321—18 |
| 3,309,600 | 3/1967 | Wellford | 321—5 XR |

JOHN F. COUCH, Primary Examiner

W. M. SHOOP, Jr., Assistant Examiner

U.S. Cl. X.R.

321—18, 19, 27; 323—48, 60